(No Model.)

A. SHEIBLY, Jr.
POWDER SPRINKLER.

No. 537,727. Patented Apr. 16, 1895.

Witnesses:
S. Grant Johnston
Frank G. Urban

Inventor:
Abraham Sheibly, Jr.
By Sam'l H. Herr
Attorney.

THE NORRIS PETERS CO., PHOTO-LITHO., WASHINGTON, D. C.

UNITED STATES PATENT OFFICE.

ABRAHAM SHEIBLY, JR., OF OREGON, PENNSYLVANIA.

POWDER-SPRINKLER.

SPECIFICATION forming part of Letters Patent No. 537,727, dated April 16, 1895.

Application filed August 10, 1894. Serial No. 519,941. (No model.)

*To all whom it may concern:*

Be it known that I, ABRAHAM SHEIBLY, Jr., a citizen of the United States, residing at Oregon, in the county of Lancaster and State of Pennsylvania, have invented certain new and useful Improvements in Powder-Sprinklers; and I do hereby declare the following to be a full, clear, and exact description of the invention, such as will enable others skilled in the art to which it appertains to make and use the same.

This invention relates to improvements in a powder sprinkler of that class in which a vessel, carrying within its body a supply of the powder to be used, has a perforated bottom through which said powder is sprinkled, and is provided with a convenient handle whereby said vessel is carried and agitated to sprinkle the powder.

The object of the invention is to provide convenient means to sprinkle paris-green, or kindred poison, over growing plants, such as potato vines, to kill the insects or bugs which infest them and often destroy the entire crop; but, more especially, to place around newly set tobacco plants rings of such poison, keeping it off from the plants, to keep therefrom, or kill, the cut-worm, or kindred vermin, now so very destructive to such plants, sometimes destroying in one night, most of the plants set the preceding day.

The features of the invention will particularly appear in the following description and will be distinctly set forth in the claims.

The purposes of the invention are attained by the means and devices illustrated in the accompanying drawings, in which similar letters and numerals designate similar parts throughout the several views, and in which—

Figure 3:
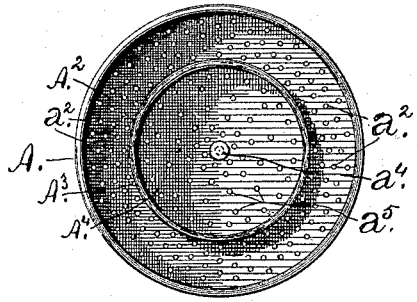
Figure 2:
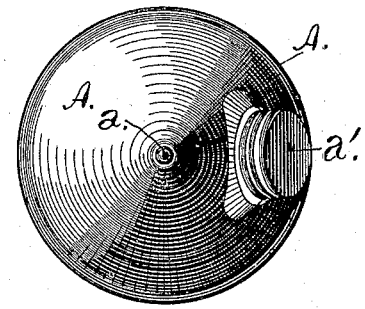
Figure 5:
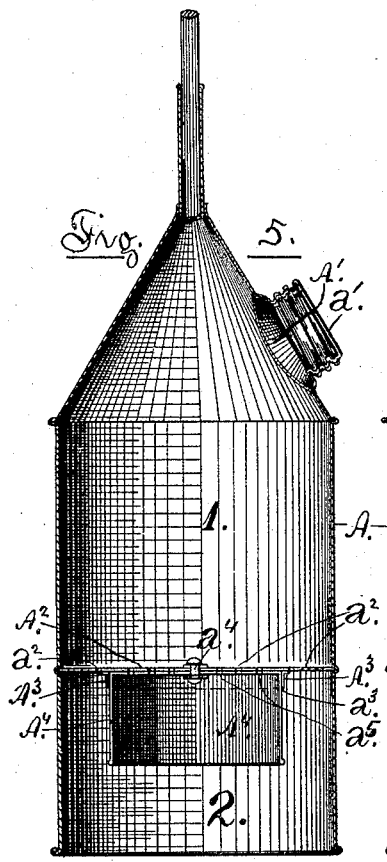
Figure 1:
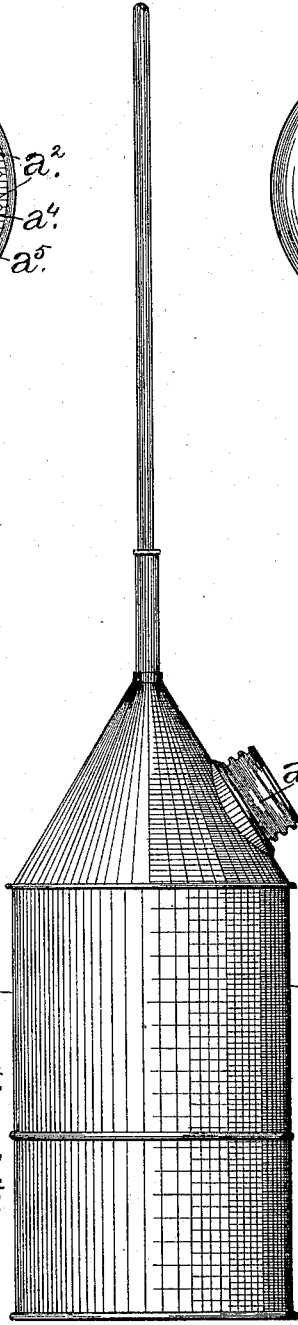
Figure 4:
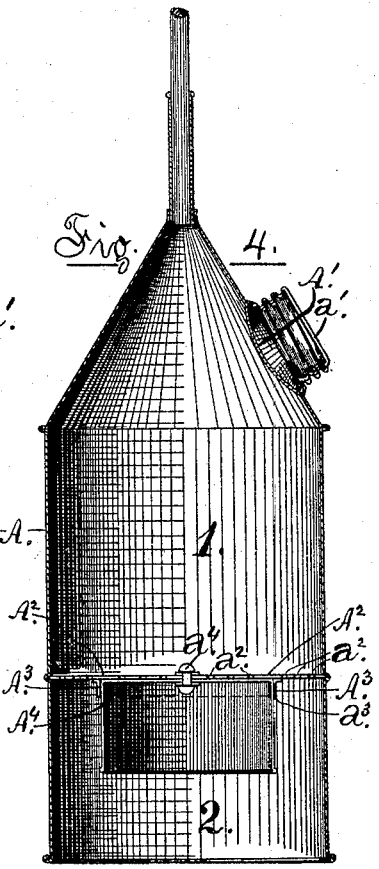

Figures 1, 2 and 3 are, respectively, side, top and bottom views of a powder sprinkler embodying the elements of the invention; and Figs. 4 and 5 are vertical sections of the same, a portion of the handle having been broken away, Fig. 4 showing a portion of the sprinkling perforations closed, and Fig. 5 all of them opened.

In the drawings A designates a can or canister which may be made of any approved material and may have any desired shape or form. It is preferably made of a good grade of tin-sheeting, having the shape or form illustrated in Figs. 1, 2 and 3; and $a$ designates a handle secured to the apex of the conical top whereby the can is carried and placed in position, and the handle may be used to agitate the can to sprinkle or drop the powder. The conical top is provided with an orifice $A'$, closed by a screw-cap $a'$, through which the powder is introduced to within the can. A bottom-plate $A^2$, provided with perforations $a^2$, is rigidly secured, around its periphery, inside the canister, to the walls thereof, forming the chamber 1 to hold the powder, and the open lower end 2 to keep the wind from scattering the powder or blow it away from the place it is desired to sprinkle, while the perforations through said bottom serve to give egress to the powder. To the under side of this bottom-plate is secured a flanged ring $A^3$ forming a circular space $a^3$ on said under side, and the bottom perforations within said space are covered or closed when it is desired to place a ring of the powder about a plant. This may be done by inserting into the flanged ring any suitable plug adapted to fill the space and securing it in place, but it is preferably done as follows: A cup $A^4$, bottom upward, is placed within said ring, $A^3$, and through the center of its bottom, now become its top, is secured to the bottom-plate, $A^2$, by a bolt and nut, but it is preferably pivoted in place by a rivet $a^4$, as shown. The bottom of this cup is provided with perforations $a^5$ to register with the central perforations $a^2$, as shown in Fig. 5. In this case the canister is adapted to sprinkle the powder over the growing plants. Now, turning the cup $A^4$ slightly on its pivot, these central perforations are cut off, or closed, as shown in Fig. 4, and the canister is adapted to place a ring of the powder around the newly set plant, as desired. Of course, provision must be made to hold the cup in place in any turned to position, as by means of a pin passed through the sides of both the cup and the ring.

It will here be observed, that the wall about the lower or open end of the canister, serves as a shield to prevent the wind from blowing the powder away in sprinkling, either growing, or newly set plants; and, that the wall of the cup $A^4$, in covering the newly set plant, will keep the powder from falling thereon but will surround it with a ring, as is desired.

Having now described my invention and shown the manner in which it performs its functions, what I do consider new, and desire to secure by Letters Patent, is—

1. The herein described powder sprinkler, comprising: a canister, having a powder receiving chamber, and an open lower end or shielding chamber; a perforated bottom-plate, rigidly secured, between said chambers, with mechanism provided for opening or closing certain central ones of said perforations; an orifice, adapted to be closed, for the admission of powder into said receiving chamber; and a handle provided, whereby to carry and to agitate said canister, all substantially as and for the purpose hereinbefore set forth.

2. The combination in a powder sprinkler, with a canister having a powder receiving chamber and a lower open-ended powder delivering or shielding chamber and a perforated bottom rigidly fixed between said chambers, a closed inlet orifice adapted to be opened for the admission of powder into said receiving chamber, and a handle provided whereby to carry said canister and to agitate the same, of an inverted cup within said delivering chamber and its bottom centrally pivoted to the under side of said fixed perforated bottom, and having perforations through the bottom thereof to register with the central ones of said fixed bottom perforations whereby a ring of powder is formed about said cup, substantially as described and for the purpose hereinbefore set forth.

3. In a powder sprinkler the combination of the following elements:—the canister A with the handle $a$, having the inlet orifice A' with the covering-cap $a'$; the fixed bottom-plate $A^2$ with the perforations $a^2$, forming the receiving chamber 1 and the delivering chamber 2; the flanged ring $A^3$ forming the circular space $a^3$; and, the inverted cup $A^4$ having the registering perforations $a^5$, with the pivoting rivet or bolt $a^4$; all arranged, combined and secured in position, substantially as described and for the purpose hereinbefore set forth.

In testimony whereof I affix my signature in presence of two witnesses.

ABRAHAM SHEIBLY, JR.

Witnesses:
PAUL A. HERR,
EDWIN BOOKMYER.